(12) United States Patent
Lerner

(10) Patent No.: US 7,537,337 B2
(45) Date of Patent: May 26, 2009

(54) EYEWEAR WITH EYEWIRE TENSIONING ASSEMBLY

(76) Inventor: Ira S. Lerner, 55 Greene St., #6, New York, NY (US) 10013

( * ) Notice: Subject to any disclaimer, the term of this patent is extended or adjusted under 35 U.S.C. 154(b) by 0 days.

(21) Appl. No.: 11/743,337

(22) Filed: May 2, 2007

(65) Prior Publication Data

US 2007/0279582 A1 Dec. 6, 2007

Related U.S. Application Data

(60) Provisional application No. 60/797,595, filed on May 4, 2006.

(51) Int. Cl.
G02C 1/08 (2006.01)
(52) U.S. Cl. .......................... 351/92; 351/106
(58) Field of Classification Search ............ 351/92, 351/106, 90, 103, 96, 99, 100, 110, 124, 351/135
See application file for complete search history.

(56) References Cited

U.S. PATENT DOCUMENTS

| | | | |
|---|---|---|---|
| 188,246 A | 5/1877 | Johnson |
| 1,358,200 A | 11/1920 | Hansen |
| 1,679,233 A | 7/1928 | Strauss |
| 1,907,749 A | 5/1933 | Dechau |
| 1,936,319 A | 11/1933 | Wingate |
| 2,065,122 A | 12/1936 | Diggins |
| 2,141,063 A | 12/1938 | Euler |
| 2,254,637 A | 9/1941 | Welsh |
| 2,492,072 A | 12/1949 | Tapner |
| D170,435 S | 9/1953 | Weissman |
| 2,737,847 A | 5/1956 | Tesauro |
| 2,770,168 A | 11/1956 | Tesauro |
| 3,498,701 A | 3/1970 | Miller |
| 3,531,118 A | 9/1970 | Mabie et al. |
| 3,531,188 A | 9/1970 | Leblanc et al. |
| 3,531,190 A | 9/1970 | Leblanc |
| 3,565,517 A | 2/1971 | Gitlin et al. |
| 3,582,192 A | 6/1971 | Gitlin |
| D221,480 S | 8/1971 | Andre |

(Continued)

FOREIGN PATENT DOCUMENTS

CA 773287 12/1967

(Continued)

OTHER PUBLICATIONS

International Glasses Design Competition '93 Japan, Issued on Oct. 5, 1993, pp. 22,30,32,33,36,40,49,50,70.

(Continued)

*Primary Examiner*—Hung X Dang
(74) *Attorney, Agent, or Firm*—Knobbe, Martens, Olson & Bear, LLP

(57) ABSTRACT

Eyewear has at least one lens. A groove extends around an outer peripheral surface of the lens. The groove receives a wire. The wire has a first end and a second end joined by a tensioning assembly. The tensioning assembly has a first member and a second member that move toward an abutting position. When the first member and the second member are brought toward each other, tension on the wire increases and the wire secures the lens in position.

26 Claims, 11 Drawing Sheets

U.S. PATENT DOCUMENTS

| | | | |
|---|---|---|---|
| 3,838,914 | A | 10/1974 | Fernandez |
| 4,021,892 | A | 5/1977 | Piper |
| 4,070,103 | A | 1/1978 | Meeker |
| 4,196,981 | A | 4/1980 | Waldrop |
| 4,380,379 | A | 4/1983 | Ahern et al. |
| 4,432,616 | A | 2/1984 | Kurosaka |
| 4,466,713 | A | 8/1984 | Tanaka |
| 4,523,819 | A | 6/1985 | Dianitsch et al. |
| 4,547,909 | A | 10/1985 | Bell |
| 4,685,782 | A | 8/1987 | Lhospice |
| D291,808 | S | 9/1987 | Meyerspeer |
| 4,822,158 | A | 4/1989 | Porche |
| 4,878,749 | A | 11/1989 | McGee |
| D307,756 | S | 5/1990 | Porsche |
| 4,958,923 | A | 9/1990 | Rosenson |
| 4,958,924 | A | 9/1990 | Parker |
| 4,973,148 | A | 11/1990 | Gazeley |
| 4,988,181 | A | 1/1991 | Riach, Jr. |
| 5,048,944 | A | 9/1991 | Porshe |
| 5,106,178 | A | 4/1992 | Akiyoshi |
| 5,162,824 | A | 11/1992 | Klemka |
| 5,181,051 | A | 1/1993 | Townsend et al. |
| 5,243,366 | A | 9/1993 | Blevins |
| 5,321,442 | A | 6/1994 | Albanese |
| 5,355,184 | A | 10/1994 | Varveris et al. |
| 5,371,554 | A | 12/1994 | Aspesi |
| 5,389,981 | A | 2/1995 | Riach, Jr. |
| 5,410,763 | A | 5/1995 | Bolle |
| 5,416,537 | A | 5/1995 | Sadler |
| 5,423,712 | A | 6/1995 | Underwood et al. |
| 5,428,407 | A | 6/1995 | Sheffield |
| 5,431,595 | A | 7/1995 | Underwood |
| D371,567 | S | 7/1996 | Fukuchi |
| 5,568,207 | A | 10/1996 | Chao |
| 5,592,243 | A | 1/1997 | Chao |
| 5,642,177 | A | 6/1997 | Nishioka |
| 5,654,785 | A | 8/1997 | Shih et al. |
| 5,663,780 | A | 9/1997 | Murai et al. |
| 5,684,558 | A | 11/1997 | Hamamoto |
| 5,710,614 | A | 1/1998 | Cereda |
| 5,724,118 | A | 3/1998 | Krebs |
| 5,737,054 | A | 4/1998 | Chao |
| 5,867,244 | A | 2/1999 | Martin |
| 5,889,574 | A | 3/1999 | Gandl-Schiller |
| 5,912,718 | A | 6/1999 | Murai et al. |
| 5,914,768 | A | 6/1999 | Hyoi |
| 6,027,214 | A | 2/2000 | Graham |
| 6,089,706 | A | 7/2000 | Pilat, Jr. |
| 6,099,119 | A | 8/2000 | Kim |
| 6,139,142 | A | 10/2000 | Zelman |
| 6,149,269 | A | 11/2000 | Madison |
| 6,264,325 | B1 | 7/2001 | Peressini et al. |
| 6,264,326 | B1 | 7/2001 | Hyoi |
| 6,343,858 | B1 | 2/2002 | Zelman |
| 6,588,897 | B1 | 7/2003 | Nadler et al. |
| 6,595,634 | B1 | 7/2003 | Pilat, Jr. |
| 6,942,337 | B2 | 9/2005 | Zelman |
| 7,063,420 | B2 * | 6/2006 | Lerner et al. ............ 351/92 |
| 7,140,727 | B2 | 11/2006 | Pilat et al. |

FOREIGN PATENT DOCUMENTS

| | | |
|---|---|---|
| CN | 572 222 | 1/1976 |
| CN | 1117593 | 2/1996 |
| DE | 17 97 366 | 1/1971 |
| DE | 85 07 761 U1 | 5/1985 |
| DE | 34 13 827 A1 | 8/1985 |
| DE | 88 06 898 U1 | 10/1988 |
| DE | 39 05 041 A1 | 8/1990 |
| DE | 39 19 489 A1 | 12/1990 |
| DE | 39 20 879 A1 | 1/1991 |
| DE | 39 21 987 A1 | 1/1991 |
| DE | 39 33 310 A1 | 1/1991 |
| DE | 92 16 919 U1 | 4/1993 |
| DE | 43 16 698 A1 | 11/1994 |
| DE | 4316698 A1 | 11/1994 |
| DE | 295 18 590 | 11/1995 |
| DE | 295 16 670 U1 | 5/1996 |
| EP | 0 469 699 A1 | 5/1992 |
| EP | 0 502 796 B1 | 9/1992 |
| EP | 0 743 545 A1 | 11/1996 |
| EP | 0 955 560 A1 | 11/1999 |
| FR | 915421 | 11/1946 |
| FR | 1037755 | 9/1953 |
| FR | 1061253 | 4/1954 |
| FR | 1266652 | 6/1961 |
| FR | 2 483 632 | 4/1981 |
| FR | 2 657 436 A1 | 7/1991 |
| GB | 812880 | 5/1959 |
| GB | 846425 | 8/1960 |
| GB | 855268 | 11/1960 |
| JP | 56-072983 | 5/1956 |
| JP | 44-15392 | 7/1969 |
| JP | 54-11842 | 9/1979 |
| JP | 54-111841 | 9/1979 |
| JP | 54-163052 | 12/1979 |
| JP | 55-50217 | 4/1980 |
| JP | 55/083022 | 6/1980 |
| JP | 55-133014 | 10/1980 |
| JP | 55-135814 | 10/1980 |
| JP | 56-29209 | 3/1981 |
| JP | 56-095214 | 8/1981 |
| JP | 56-153317 | 11/1981 |
| JP | 57-178215 | 11/1982 |
| JP | 57-184910 | 11/1982 |
| JP | 60-146217 | 8/1985 |
| JP | 61-2621 | 1/1986 |
| JP | 5985382 | 1/1986 |
| JP | 63-188626 | 8/1988 |
| JP | 1-136114 | 5/1989 |
| JP | 5-157997 | 6/1993 |
| JP | 05-196899 | 8/1993 |
| JP | 5-40493 | 10/1993 |
| JP | 05-289029 | 11/1993 |
| JP | 06-265828 | 9/1994 |
| JP | 06-331943 | 12/1994 |
| JP | 07-028001 | 1/1995 |
| JP | 7-10722 | 2/1995 |
| JP | 07-056123 | 3/1995 |
| JP | 7-128620 | 5/1995 |
| JP | 07-244259 | 9/1995 |
| JP | 08-050263 | 2/1996 |
| JP | 274588 | 4/1996 |
| JP | 09-043544 | 2/1997 |
| JP | 09-061754 | 3/1997 |
| JP | 9-101489 | 4/1997 |
| JP | 7-156856 | 8/1997 |
| JP | 2000-122001 | 4/2000 |
| JP | 2001-166266 | 6/2001 |
| JP | 2002-031783 | 1/2002 |
| SU | 220885 | 9/1968 |
| WO | WO 90/09611 | 8/1990 |
| WO | WO 95/18986 | 7/1995 |
| WO | WO 95/23995 | 8/1995 |
| WO | WO 99/42890 | 8/1999 |
| WO | WO 03014806 A1 | 2/2003 |
| WO | WO 03/040809 | 5/2003 |
| WO | WO 2004004550 A2 | 1/2004 |

OTHER PUBLICATIONS

New Product Announcement Supportign Material Q & A of Pentax Magnet Eyeglass Frame; Oct. 1995; Pentax Vision Co., Ltd & Hoya Corp.

Rex-Oval Frame Drawing; Jan. 5, 1994; Sunreeve.

Publication of Pat. No. 5,389,981; Feb. 14, 1995; Eyeglasses Having Magnets Attached Thereto For Improving The Blood Circulation of the Eyes.

Pentax Vision Co., Ltd.; Oct. 3, 1995; Pentax Magnet Eyeglass Frames.

Twin Come Catalog Advertisement; Nov. 1995; They Change From Glasses to Sunglasses with One Touch; 5 pages.

Translation of DE 88 06 898; Oct. 27, 1988; Magnetic Spectacle Frame and Magnetic Attachment Lens Piece.

Japanese Patent Office Patent Journal; Kokai Utility Model No. SHO 61[1986]-2621; Jan. 9, 1986; Glasses Having Lenses Capable of Insertion and Removal.

Baltimore Business Publications, Inc. 1995; Jul. 28, 1995; Copyright 1995; vol. 13; No. 10; Sec. 1; p. 2; Magnetic sunglasses by Chameez Inc, of Baltimore; 1 page.

PR Newswire Association, Inc.; Copyright 1995; Jul. 27, 1995; Section: Financial News; Magnetic Sunglases, Chameez, Inc., Baltimore, MD; 2 pages.

* cited by examiner

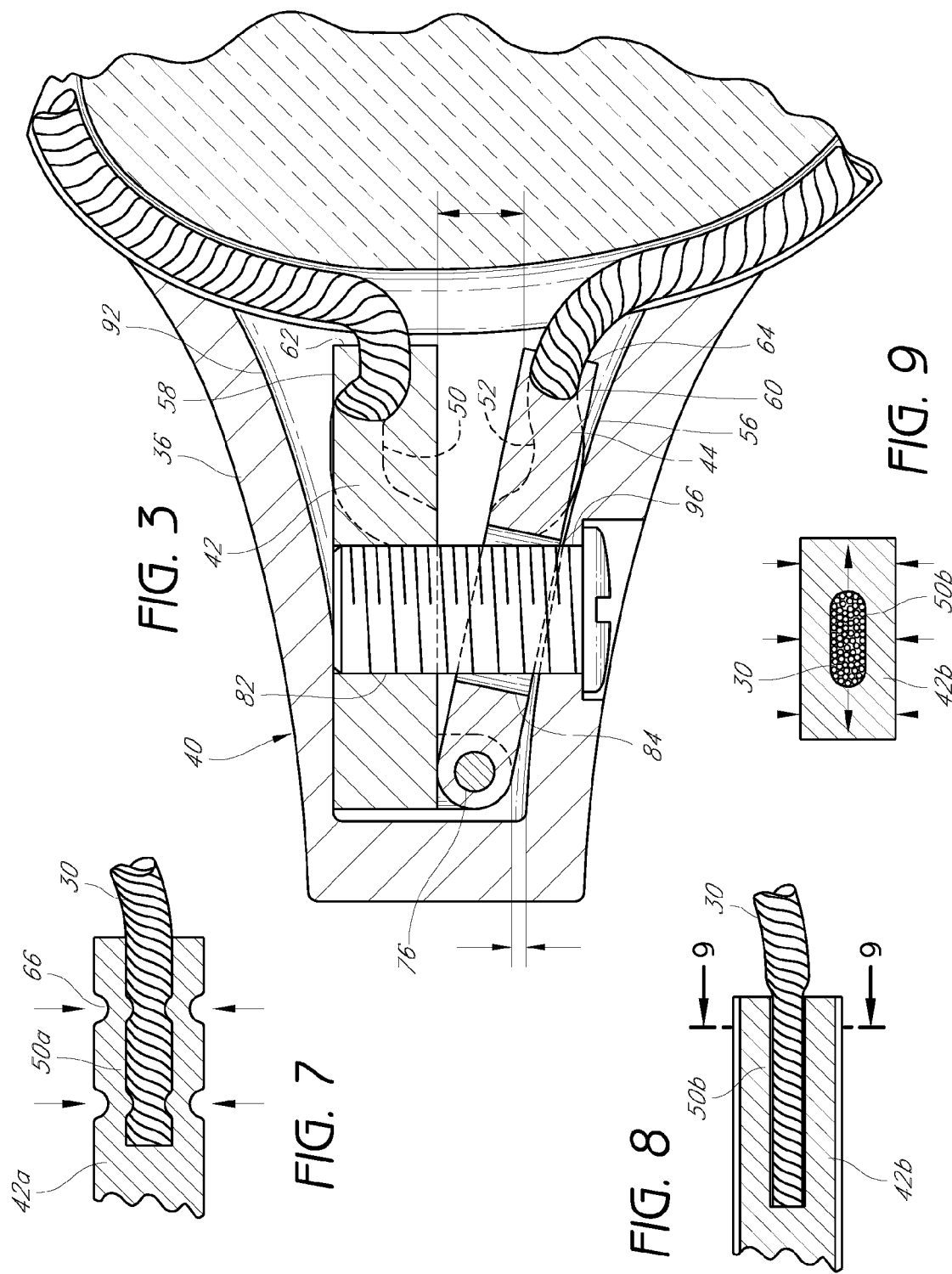

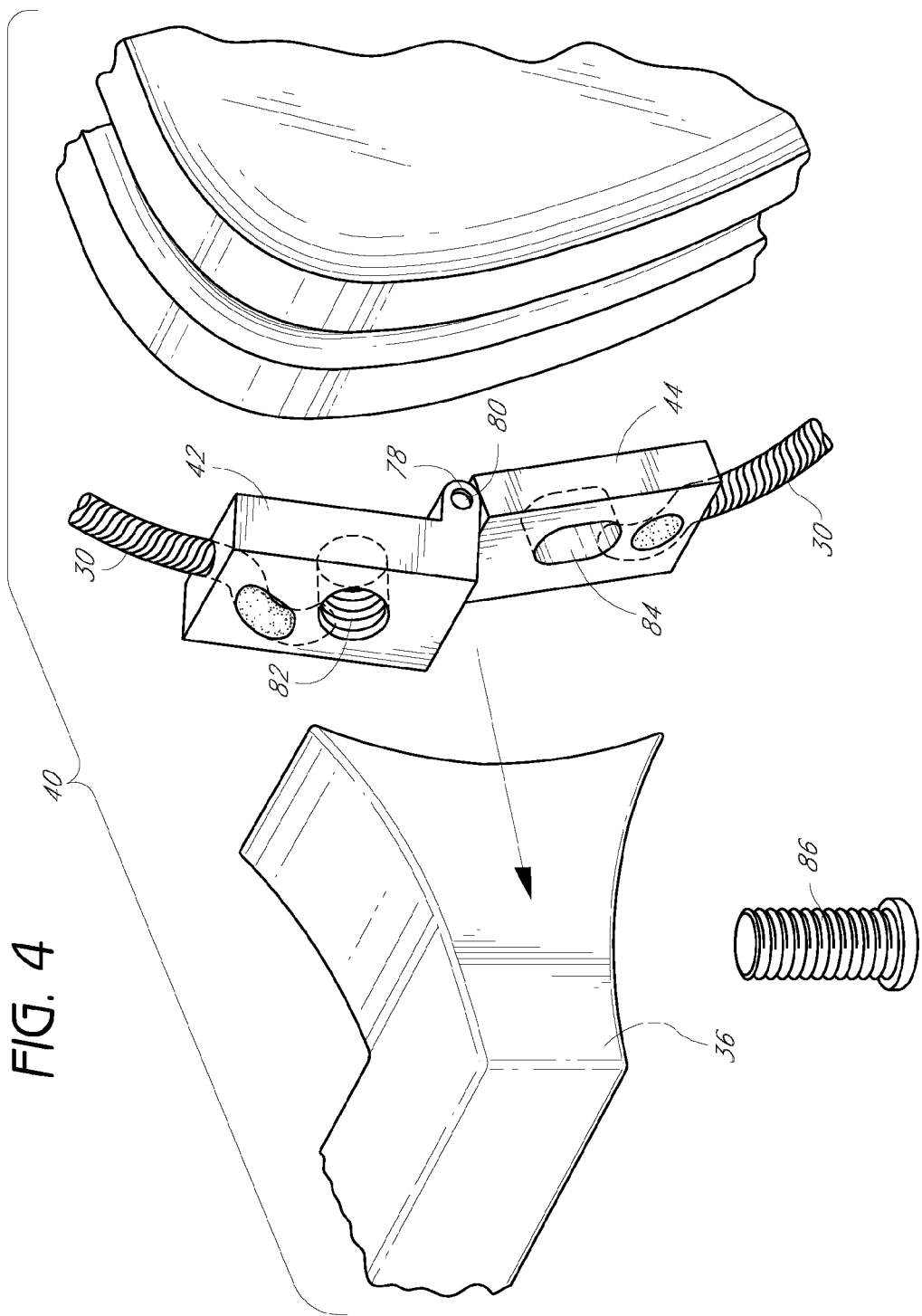

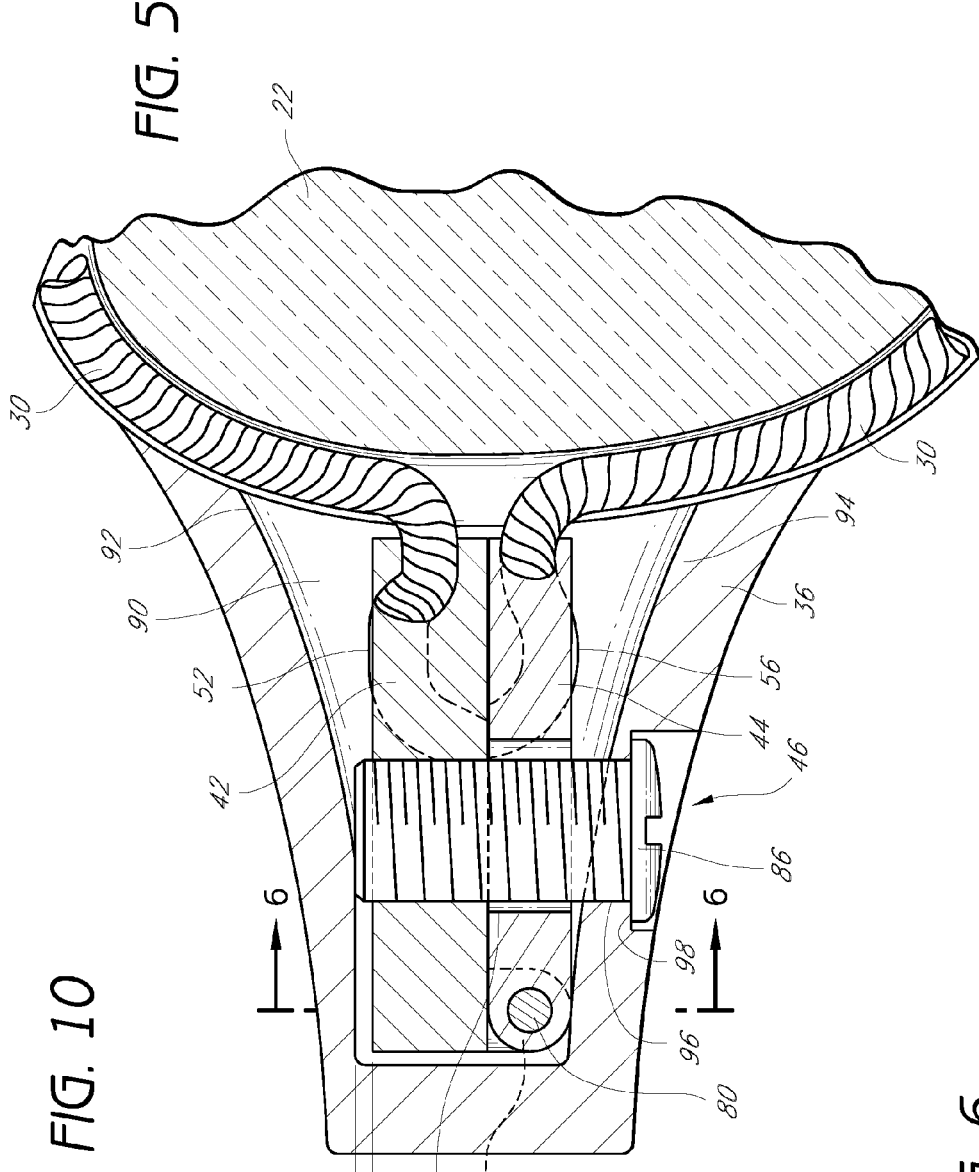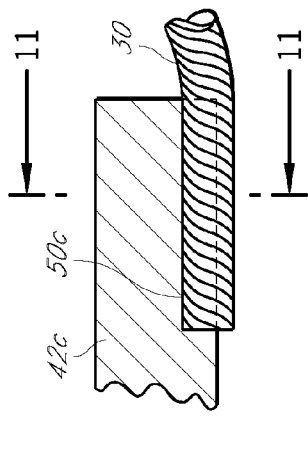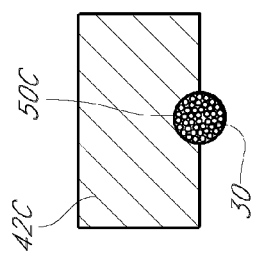

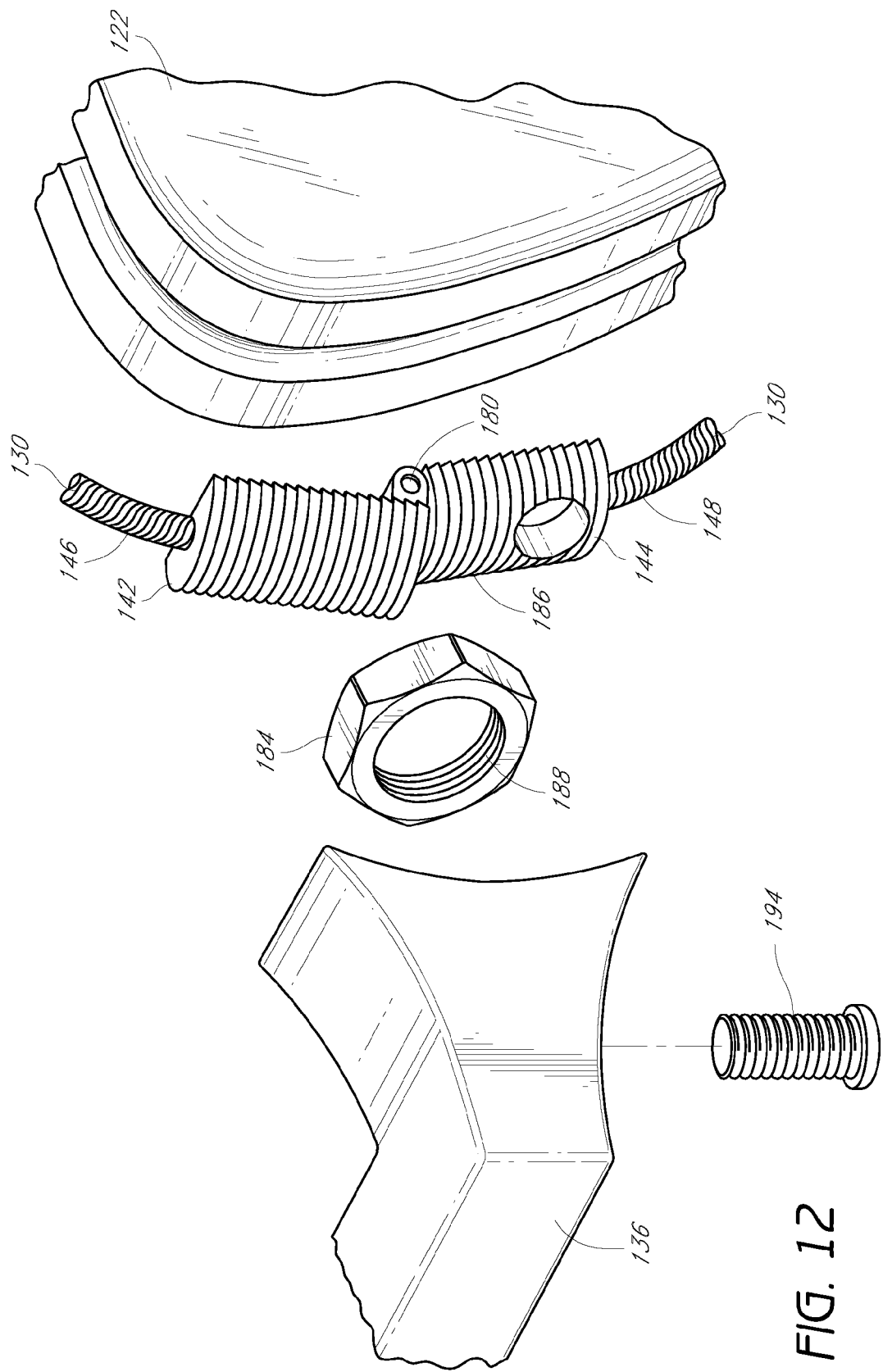

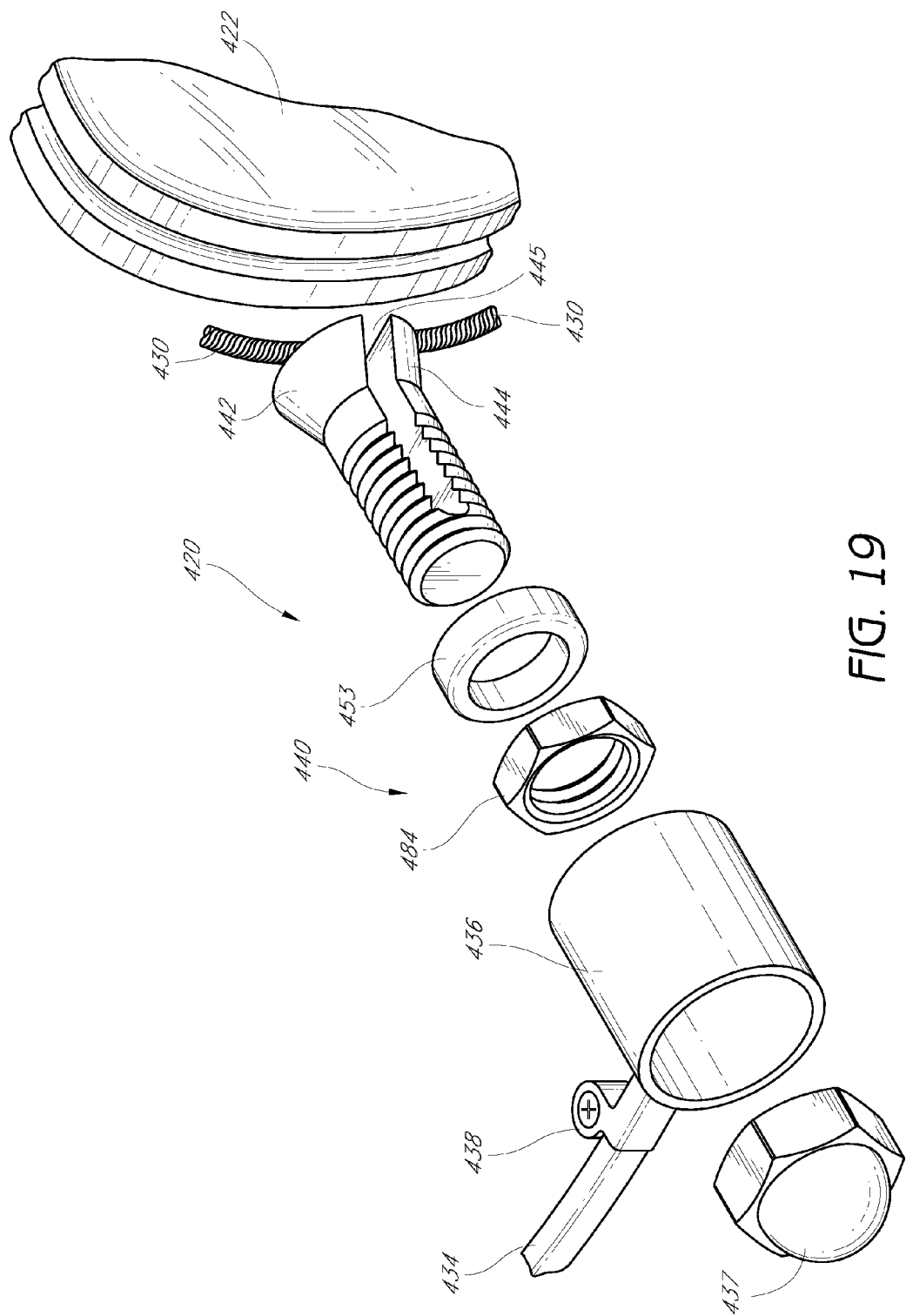

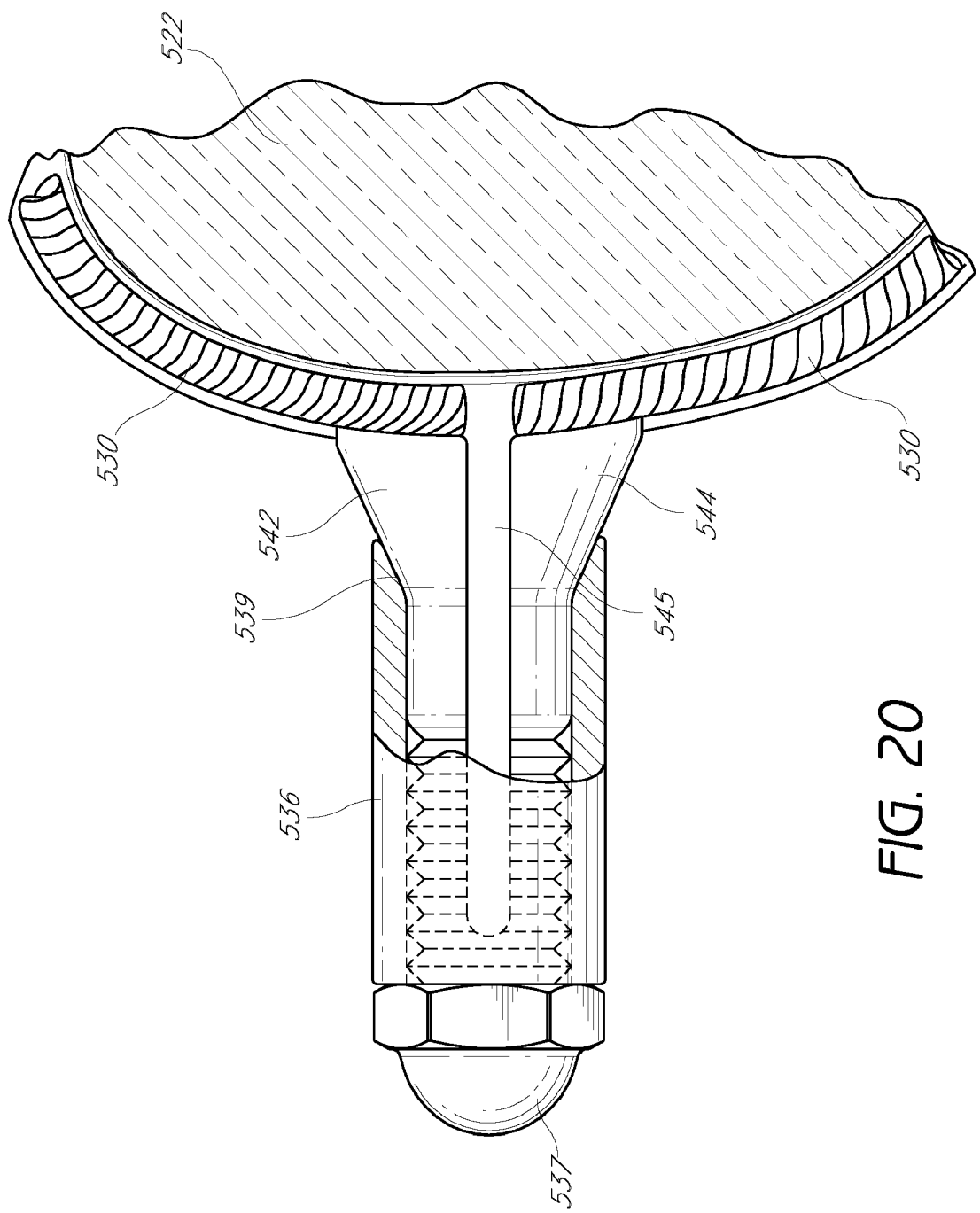

EYEWEAR WITH EYEWIRE TENSIONING ASSEMBLY

CROSS-REFERENCE TO RELATED APPLICATIONS

This application claims the priority benefit under 35 U.S.C. §119(e) of U.S. Provisional Patent Application No. 60/797,595, filed on May 4, 2006, which is hereby incorporated by reference in its entirety.

BACKGROUND OF THE INVENTION

1. Field of the Invention

The present invention generally relates to eyewear. More particularly, certain features, aspects and advantages of the present invention relate to rimless eyewear having a tensioning assembly.

2. Description of the Related Art

Eyewear styles change frequently and fashionable eyewear can be costly to purchase. In the past, eyewear style has been defined by a frame formed at least partially of metal and/or resin based materials. As such, the eyewear was heavy and the style and size of the lenses were fixed based upon the frame. To accommodate the fashion whims and optical needs of the public, hundreds of eyewear styles with differing lens sizes and shapes must currently be manufactured. To manufacture a frame for each style typically requires a large manufacturing run of each size and shape. This is costly and can result in a cost that is not recovered if the eyewear style is not popular enough to sell sufficient quantities.

Recently, so-called rimless eyewear has been introduced in which temples and a bridge are directly secured to the lenses with threaded fasteners, posts or the like, which require holes to extend through the lenses. Such rimless eyewear has been quickly adopted within the fashion world. The rimless eyewear is very light due to the lack of a heavy frame around the lenses.

However, there are several disadvantages of the truly rimless eyewear. First, the holes used to secure a bridge and a pair of temples to the lenses must be drilled very precisely. Thus, most optical technicians are not able to perform the drilling in-house and outside services must be used. Such outside services are costly and add additional time to the eyewear supply process such that end users need to wait longer for the eyewear. Further, drilling the necessary holes in the eyewear can lead to lens breakage, even by the outside services. The cost of replacement lenses obviously must be calculated into the end cost of the eyewear, which further increases the cost of eyewear. Finally, the lens materials often may not have the sufficient strength for the long term use and abuse often attributed to some eyeglass wearers. Persons working in the eyewear industry, therefore, have been trying to find a better alternative to the truly rimless eyewear currently found in the industry.

SUMMARY OF THE INVENTION

Even more recently, a rimless style of eyewear has been proposed in which the lenses are circumscribed by a thin wire. Examples of such eyewear are described in co-pending U.S. patent application Ser. No. 11/453,337, filed on Jun. 14, 2006, which is a continuation of U.S. patent application Ser. No. 10/846,349, filed on May 14, 2004 and issued as U.S. Pat. No. 7,063,420 on Jun. 20, 2004, each of which is hereby incorporated by reference in its entirety. Other examples of such eyewear are described in co-pending U.S. patent application Ser. No. 10/846,953, filed on May 14, 2004. Such eyewear also is disclosed in co-pending U.S. patent application Ser. No. 11/563,559, filed on Nov. 27, 2006, as well as the following applications from which that application claims priority: U.S. patent application Ser. No. 10/846,357, filed on May 14, 2004, now U.S. Pat. No. 7,140,727; U.S. patent application Ser. No. 10/610,862, filed on Jun. 30, 2003, now U.S. Pat. No. 7,104,645; U.S. patent application Ser. No. 10/269,811, filed on Oct. 11, 2002, now U.S. Pat. No. 6,595,634; and U.S. Provisional Patent Application No. 60/394,837, filed on Jul. 10, 2002. Each of the above identified applications and patents is hereby incorporated by reference in its entirety As described in these patents and applications, the wire also passes through a portion of a bridge and a portion of an end piece, to which a temple can be hinged. The disclosed constructions, however, can be difficult to manufacture while minimizing undesired movement of the components prior to the wires being tightened into position. In addition, during tightening of the wire, the wire may drag along a side edge of a closing mechanism a fairly significant distance. The rubbing action between the wire and the closing mechanism can weaken the wire during assembly and, in some circumstances, can result in breakage of the wire. Thus, an improved wire closing configuration is desired.

It also is preferred that the adjustable tensioning system have an exterior configuration that closely resembles a standard end piece. Such a construction would minimize the visual prominence of the tensioning system. For instance, such a construction could minimize any overlap of the mounting or tensioning system into the lens such that the prominence of the mounting structure can be reduced and the eyewear can become even more transparent to observers of the user of the eyewear.

Accordingly, certain aspects of the present invention are directed to a tensioning system for rimless eyewear that comprises any of a number of embodiments of a flexible wire tensioning mechanism. Various ones of the disclosed flexible wire tensioning embodiments ensure ease of assembly while securing the lens in the rimless eyewear. One feature that makes for ease of assembly in at least some of the disclosed embodiments is that the optical technician does not have to physically handle the ends of the wire. Rather, in such embodiments, the ends of the wire are secured within the tensioning mechanism so that the optical technician need only use simple tools to loosen the assembly, insert the lenses and tighten the assembly, thereby improving the efficiency of the eyeglass assembly process.

In most preferred embodiments, the system is sized and configured to fit within a housing or to define a housing that resembles end pieces in present eyewear systems. In other words, when assembled, the housing would have a height, a width and a depth, with at least one of the width and the depth being substantially greater than the height. In other words, most present eyewear feature end pieces (e.g., where the temples attach to the lens supporting structures) that do not have a height as the longest dimension.

Since there are many well-known methods of attaching temples to an end piece extending from the outside perimeter edge of a lens, it should be understood in reading any descriptions of the embodiments of the present invention that any suitable method can be used to attach the temples to the various closing mechanisms described herein.

One aspect of the present invention relates to eyewear comprising a lens. The lens comprises an outer peripheral surface. The outer peripheral surface comprises a groove. A wire is positioned in the groove. The wire comprises a first end and a second end. The first end is connected to a first termination member. The second end is connected to a second termination member. The first termination member and the second termination member are moveably secured together. At least one of the first termination member and the second termination member is connected to an ear stem.

Another aspect of the present invention relates to eyewear comprising a lens. The lens comprises an outer peripheral surface. The outer peripheral surface comprises a groove. A wire is positioned in the groove. The wire comprises a first end and a second end. The first end and the second end are joined by means for pivotably connecting the first end and the second end.

BRIEF DESCRIPTION OF THE DRAWINGS

These and other features, aspects and advantages of certain embodiments of the present invention will be described with reference to drawings of the embodiments. The drawings comprise 18 figures.

FIG. 3 is a cross-sectional view of the hinged tension assembly of FIG. 1 taken along the line 3-3 in FIG. 2 and shown in a partially closed position.

FIG. 4 is an exploded perspective view of the hinged tension assembly of FIG. 1.

FIG. 5 is a cross-sectional view of the hinged tension assembly of FIG. 1 similar to that of FIG. 3 but showing the hinged tension assembly in a substantially closed position.

FIG. 6 is a cross-sectional view of the hinged tension assembly of FIG. 1 taken along the line 6-6 in FIG. 5.

FIG. 7 is a cross-sectional view of a portion of the hinged tension assembly that shows a wire crimped inside of a wire termination member.

FIG. 8 is another cross-sectional view of a portion of the hinged tension assembly that shows a wire squeezed inside of a wire termination member.

FIG. 9 is a cross-sectional view of the configuration shown in FIG. 8 and taken along the line 9-9 in FIG. 8.

FIG. 10 is a cross-sectional view of a portion of the hinged tension assembly that shows a wire recessed into and secured to a wire termination member.

FIG. 11 is a cross-sectional view of the configuration shown in FIG. 10 and taken along the line 11-11 in FIG. 10.

FIG. 12 is an exploded perspective view of another embodiment of a hinged tension assembly that is arranged and configured in accordance with certain features, aspects and advantages of the present invention.

FIG. 19 is an exploded perspective view of another embodiment of a tension assembly that is arranged and configured in accordance with certain features, aspects and advantages of the present invention.

FIG. 20 is a partially sectioned view of an embodiment of a tension assembly that is arranged and configured in accordance with certain features, aspects and advantages of the present invention.

DETAILED DESCRIPTION OF THE PREFERRED EMBODIMENT

Figure 1:
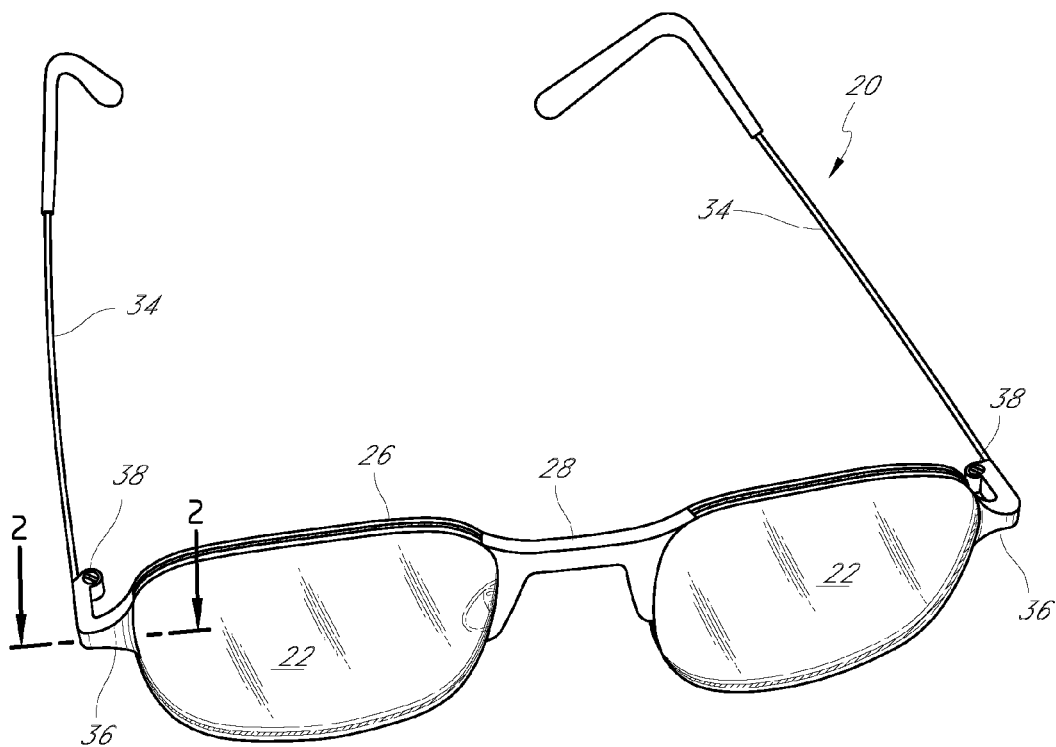
FIG. 1 is a perspective view of a fully assembled pair of eyewear that has a hinged tension assembly that is arranged and configured in accordance with certain features, aspects and advantages of the an embodiment of the present invention.

The present invention generally relates to eyewear frame assemblies that feature a flexible cable or a wire that substantially encircles each lens such that the lens can be secured in position within a loop defined by the cable or the wire. With reference now to FIG. 1, a pair of eyewear 20 is illustrated therein. The eyewear 20 advantageously is arranged and configured in accordance with certain features, aspects and advantages of the present invention. As shown, the eyewear 20 comprises at least one and preferably two lenses 22. The lenses 22 can have any size, shape or configuration desired. In the illustrated arrangement, the lenses 22 each preferably comprise a groove, channel or the like, which groove 24 (FIG. 2) is formed in a peripheral edge 26 of each lens 22. Thus, a land 29 is defined on each side of the groove 24.

The lenses 22 can be sized and shaped using a lens pattern (not shown) or any other suitable technique. The lenses 22 can be prepared and cut in any suitable manner, usually depending upon the application (e.g., tinted lenses, prescription lenses, protective lenses, etc.). Preferably, the peripheral edge 26 is generally flat, such as commonly associated with the terminology "rimless cut," which can be made on standard machinery used in the eyewear industry when that machinery is configured to make a "rimless setting." While the generally flat face is preferred along the peripheral edge 26, some deviation from a generally flat face also can be practicable. Accordingly, in at least some arrangements, the peripheral edge 26 of the lens 22 can have a curved profile.

Figure 2:
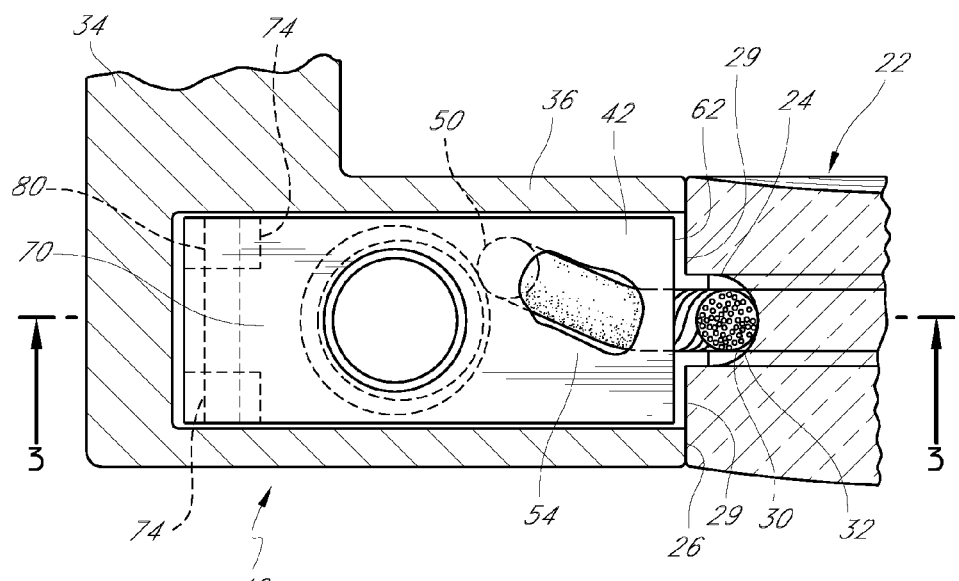
FIG. 2 is a top cross-sectional view of the hinged tension assembly of FIG. 1 taken along the line 2-2 in FIG. 1.

The groove 24 preferably has a depth and a width. The depth is a dimension that reflects the direction into the lens 22 toward a center of the lens 22 from the peripheral edge 26 (e.g., generally normal to the line of sight through the lens 22) while the width is the distance between the lands 29, which is generally a distance along the line of sight through the lens 24. The groove 24 preferably has a width that is as small as possible while still accommodating a wire 30, which is discussed in more detail below and in the applications and patents that have been incorporated by reference above. The depth of the groove 24 preferably is substantially the same as a diameter of the wire 30. In some arrangements, the groove 24 can be shallower than the diameter of the wire 30 and, in other arrangements, the groove 24 can be deeper than the diameter. In the illustrated configuration, as shown in FIG. 2, the groove 24 is deeper than the diameter of the wire 30. In one other configuration, the groove 24 can vary between shallower and deeper such that the wire 30 can be viewed in some regions and not in others to add a unique visual interest to the eyewear design. The outer portion of the wire 30 preferably is generally flush with the peripheral edge 26 of the lens 22 such that the wire 30 is substantially hidden from view.

In one embodiment, the wire 30 comprises a multiple filament construction. In other words, the wire 30 preferably comprises more than one filament, fiber or strand, as generally indicated by reference numeral 32 (see FIG. 2). In some embodiments, the filaments 32 are made from a metal, a metal alloy, a nylon, a polymer, a resin, a natural fiber or another naturally occurring or man-made material that is suitably strong in tension while maintaining sufficient flexibility to secure a lens in a manner described herein. In some embodiments, the wire 30 may be manufactured of a type of fiber-optic material. A single filament also can be used.

The multiple filaments 32 preferably are intertwined, braided or wrapped together to define the wire 30. The wire 30 can be encased within a sheath, cover, jacket or casing, if desired. By enclosing the multiple filaments 32 in a casing or the like, the filaments 32 can be better protected against normal wear and tear that might otherwise occur. In one embodiment, the wire 30 is constructed similarly to a braided fishing leader wire.

The diameter of the wire 30 preferably is fairly small while large enough to suitably withstand the tensile forces applied to it during use of the eyewear. In some embodiments, the wire 30 has an average diameter of between about 0.1 mm and about 3.0 mm. Preferably, the wire 30 has an average diameter of between about 0.2 mm and about 1.6 mm, and more preferably has an average diameter of between about 0.1 mm and about 0.6 mm, and even more preferably has an average diameter of between about 0.2 mm and about 0.4 mm. In one embodiment, the wire 30 has an average diameter of about 0.4 mm.

The eyewear 20 preferably comprises two temples, ear pieces or ear stems 34 that are connected to the respective lenses at corresponding outwardly projecting end pieces 36. The stems 34 can be pivotally connected to the end pieces 36 in any suitable manner. In some arrangements, the stems 34 are monolithically formed with the end pieces 36. In such arrangements, the stems 34 may not be pivotally connected to the end pieces 36. In the arrangement of FIG. 1, the stems 34 are pivotally connected by a hinge 38 to a rearwardly extending portion of the end pieces 36. The stems 34 can be formed of any suitable material and can have any suitable construction.

As for overall sizing, the end pieces 36 preferably resemble end pieces found on standard eyewear frames so that the end pieces 36 have a minimal impact on the appearance of the eyewear. For instance, on standard eyewear frames, the end pieces have a height, width and depth with the width being the dimension outward from the lenses and the depth being the dimension rearward toward the ears of the wearer. These end pieces usually have a height that is smaller than at least one of the width and the depth. In some of the standard eyewear, the height of the end pieces is smaller than both the width and the depth. In the illustrated arrangement, the width is at least two times the average height of the end pieces 36. Other sizes also are practicable.

With reference now to FIGS. 2-6, an embodiment of a hinged tensioning assembly 40 will be described. The assembly 40 preferably comprises at least a first member 42 and a second member 44 that are pivotally joined together. The first member 42 and the second member 44 can comprise wire termination members in some embodiments. In other words, a first end 46 of the wire 30 can be joined or coupled to the first member 42 and a second end 48 of the wire 30 can be joined or coupled to the second member 44.

As used herein, unless otherwise stated, the wire 30 can be a single wire or the wire 30 can be two or more separate wires that are connected together in any suitable manner. For example, the wire 30 may comprise a first portion that is coupled to a nose bridge 28 and that extends over an upper portion of the lens 22 and a second portion that also is coupled to the nose bridge 28 and extends over a lower portion of the lens 22. In any event, the first member 42 and the second member 44 can be joined to two end portions of the wire 30.

With reference to FIGS. 7-11, the wire 30 can be secured to the first and second members 40, 42 in any suitable manner. In one configuration, each of the first and second members 40, 42 comprises a passage 50, 52. As illustrated in FIG. 2 and FIG. 3, the passages 50, 52 extend through first ends 58, 60 of the first and second members 40, 42 respectively. While the illustrated passages 50, 52 extend through the terminal end surface 62, 64 of the first ends 58, 60, the passages 50, 52 can extend through other surfaces of the first ends 58, 60. Preferably, each of the passages 50, 52 breaks through the surfaces that define the associated member 42, 44 three times. Other configurations are possible.

Preferably, a portion 54, 56 of the first ends 46, 48 of the wire 30 extends through an outer surface 62 of the first member 42 and an outer surface 64 of the second member 44, respectively (e.g., a top, end or side surface of the first member 42 and a bottom, end or side surface of the second member 44). Advantageously, by extending through an outer surface 62, 64 of the first and second members 42, 44, the wire 30 is less likely to interfere with full closing of the hinged tensioning assembly 30 in which inner surfaces of the first and second members 42, 44 are generally brought into abutment. While a construction can be used in which the hinged tensioning assembly has a closed position with the two members 42, 44 spaced apart, such a construction is larger than the illustrated abutting construction. Thus, while practical, such a spaced construction is not optimal.

Moreover, in the illustrated configuration, the portions 54, 56 of the first and second ends 46, 48 of the wire 30 and the first and second members 42, 44 can be secured by welding, soldering, brazing, adhering, cohering, knotting, press fitting, anchoring, enlarging a portion or the like. Thus, the wire 30 can be permanently secured to the first and second members 42, 44 in some preferred embodiments. While permanently securing the members 42, 44 to the wire 30 is desired, it is not necessarily required.

With reference to FIG. 7, the wire 30 also can be secured to a first member 42a by crimping. As illustrated, the wire 30 can be inserted into a passage 50a and the first member 42 then can be secured on the wire 30 by forming bends or creases 66 in the first member 42a. Such a construction also permanently secures the wire 30 to the first member 42a. The wire 30 also can be permanently secured to the second member in a similar manner.

With reference to FIGS. 8 and 9, the wire 30 can be secured to a first member 42b by deforming the first member 42b. As illustrated, the wire 30 can be inserted into a passage 50b. With the wire 30 inserted into the passage 50b, the first member 42b can be deformed (e.g., compressed from the outer dashed lines to the solid lines) such that the first member 42b and the wire 30 are deformed in a radial direction of the wire 30 (shown by vertical arrows and horizontal arrows in FIG. 9). In the illustrated construction, the wire 30 and the first member 42b are compressed such that the wire assumes an oblong cross-section and the first member 42b has a reduced height. Other deformations also can be used. Such a construction preferably permanently secures the wire 30 to the first member 42b. The wire 30 also can be permanently secured to the second member in a similar manner.

With reference now to FIGS. 10 and 11, the wire 30 can be secured to a first member 42c by defining at least a chord of a passage 50c in a surface of the first member 42c. The chord of the passage 50c defines a recess in a surface of the first member 42c. In the illustrated configuration, the recess is formed along an inner surface (i.e., a surface of the first member 42c that will face the second member) but the recess can be formed along any surface, as discussed above. The wire 30 and the first member 42c can be secured together in any suitable manner including, but not limited to, welding, soldering, brazing, adhering, cohering or the like. In some configurations, no recess or passage is formed and the wire simply is secured to an outer surface of the first and/or second member.

With reference again to FIGS. 2 and 3, the first member 42 and the second member 44 preferably are joined together at respective second ends 70, 72. In the illustrated configuration, the second ends 70, 72 are joined by a hinge construction. The illustrated hinge comprises a pair of fingers 74 and an aperture 76. Preferably, the fingers 74 are spaced apart from each other and disposed on one of the first and second members 42, 44. In the illustrated construction, the fingers 74 are disposed on the first member 42 and the aperture 76 extends through the second member 42. Other configurations are possible. Preferably, the fingers 74 each also include apertures 78 that are generally aligned with the aperture 76. Thus, a pin 80 or the like can extend through the apertures 78, 76, 78 to pivotally secure the first member 42 to the second member 44. Other manners of pivotally connecting the first and second members 42, 44 also can be used.

As illustrated in FIG. 4, the first member 42 also comprises a threaded opening 82 while the second member 44 comprises a corresponding opening 84. In some configurations, the second member 44 can be shortened such that the opening 84 is not needed (i.e., the end of the second member 44 is positioned such that the threaded opening 82 does not overlap the second member 44). Along these lines, it also is possible to secure one end of the wire 30 directly to the end piece 36 and to pivotably connect the first member 44, which is connected to the other end of the wire 30, directly to the end piece 36 with the threaded opening positioned closer to the lens 22. Such a construction reduces the interchangeability of the various components and, therefore, is less desirable but is feasible.

With reference now to FIG. 3 and FIG. 5, the opening or hole 84 advantageously is oversized relative to a fastener 86. Thus, the second member 44 can move relative to the fastener 86. In some configurations, the openings can be reversed with the second member comprising the threaded opening 82. The illustrated configuration, however, advantageously allows the threaded fastener 86, such as a screw, to be inserted from the bottom, through the corresponding opening 84 and into the threaded opening 82, which somewhat obscures the fastener 86 from view during normal wearing of the eyewear 20. Inverting the assembly with the second member having the threaded opening would result in the fastener being inserted from the top, which would likely make the fastener more visually apparent. Insertion of the fastener 86 from the bottom is more aesthetically pleasing.

With reference primarily to FIG. 3, the end piece 36 preferably comprises a recess 90 that is sized and configured to receive at least a portion of the hinged first and second members 42, 44. Preferably, when the tensioning assembly 40 is in the closed position, the recess 90 defines a gap G between at least one surface of the tensioning assembly 40 and the inner walls that define the recess 90. The recess 90 preferably comprises at least one of an upper sloping wall 92 and a lower sloping wall 94. In some configurations, at least one of a front wall and a back wall can be sloped. The sloping wall or walls can help to close the hinged tensioning assembly 40 or can help maintain the hinged tensioning assembly 40 in a closed or partially closed position. In one embodiment, the shape of the recess 90 helps to tension the wire loop sufficiently for normal use of the eyewear 20 while the hinged tensioning assembly 40 is disposed within the recess 90.

An opening 96 preferably extends through at least one of the upper wall 92 and the lower wall 94 such that the opening either extends through a sloping wall or a wall opposing a sloping wall. The opening 96 is sized and configured to accommodate the fastener 86. In the illustrated configuration, the opening comprises a shoulder 98 that defines a countersink. Other configurations may not have a shoulder.

As illustrated, the hinged tensioning assembly 40 preferably is permanently joined to the wire 30. The first and second members 42, 44 define first and second wire termination members that fold together about a hinge point that is defined by the pin 80 in the illustrated configuration. As the first and second members 42, 44 fold together, the wire 30 is tightened about the lens 22. In one preferred configuration, as the first and second members 42, 44 fold together sufficiently to be inserted into the recess 90 of the end piece 36, the wire 30 is tightened around the lens 22 sufficiently to secure the lens 22 within the loop defined by the wire 30 and the hinged tensioning assembly 40.

With the hinged tensioning assembly 40 folded into a partially closed position and with the hinged tensioning assembly 40 positioned inside of the illustrated end piece 36, the fastener 86 can be inserted through the hole 96 in the end piece 36, through the opening 84 in the second member 44 and threaded into the threaded opening 82 of the first member 42. As the fastener 86 threads into the threaded opening 82, the first and second members 42, 44 draw together. As the first and second members 42, 44 draw together, the wire 30 tightens about the lens 22. Thus, in the illustrated configuration, the fastener 86 secures the end piece 36 in place relative to the hinged tensioning assembly and forms a portion of the hinged tensioning assembly 40, which tightens the wire 30 about the periphery of the lens 22. In other configurations, however, the wire loop tension can be adjusted separately from the component or components used to secure the end piece 36 to the assembly 40.

When the wire 30 is secured to the hinged tensioning assembly 40 and the hinged tensioning assembly 40 is in an open position (which still defines a closed loop with the wire), the diameter of the loop defined at least in part by the wire 30 and the hinged tensioning assembly 40 is enlarged or increased. In other words, the length of the perimeter or the circumferential length is increased. Increasing the diameter facilitates insertion of the lenses. Folding the first and second members 42, 44 together decreases the diameter and tightens the loop around the lens 22.

With reference now to FIG. 12, another hinged tensioning assembly 140 is illustrated therein. The illustrated tensioning assembly 140 comprises a first member 142 and a second member 144. The first and second members 142, 144 preferably define a generally cylindrical member when combined together. Other configurations also are possible.

The first member 142 preferably is secured to a first end 146 of a wire 130 and the second member 144 preferably is secured to a second end 148 of the wire 130. The wire can have any suitable construction, including those described above, and the wire and each of the first and second members 142, 144 can be secured together in any suitable manner, including those described above.

Moreover, the first and second members 142, 144 can be secured together in any suitable manner, including those described above. In some configurations, the two members 142, 144 are hinged together such that they are pivotally connected. As illustrated, the first member 142 and the second member 144 can be joined by a pin 180 or the like.

Figure 13:
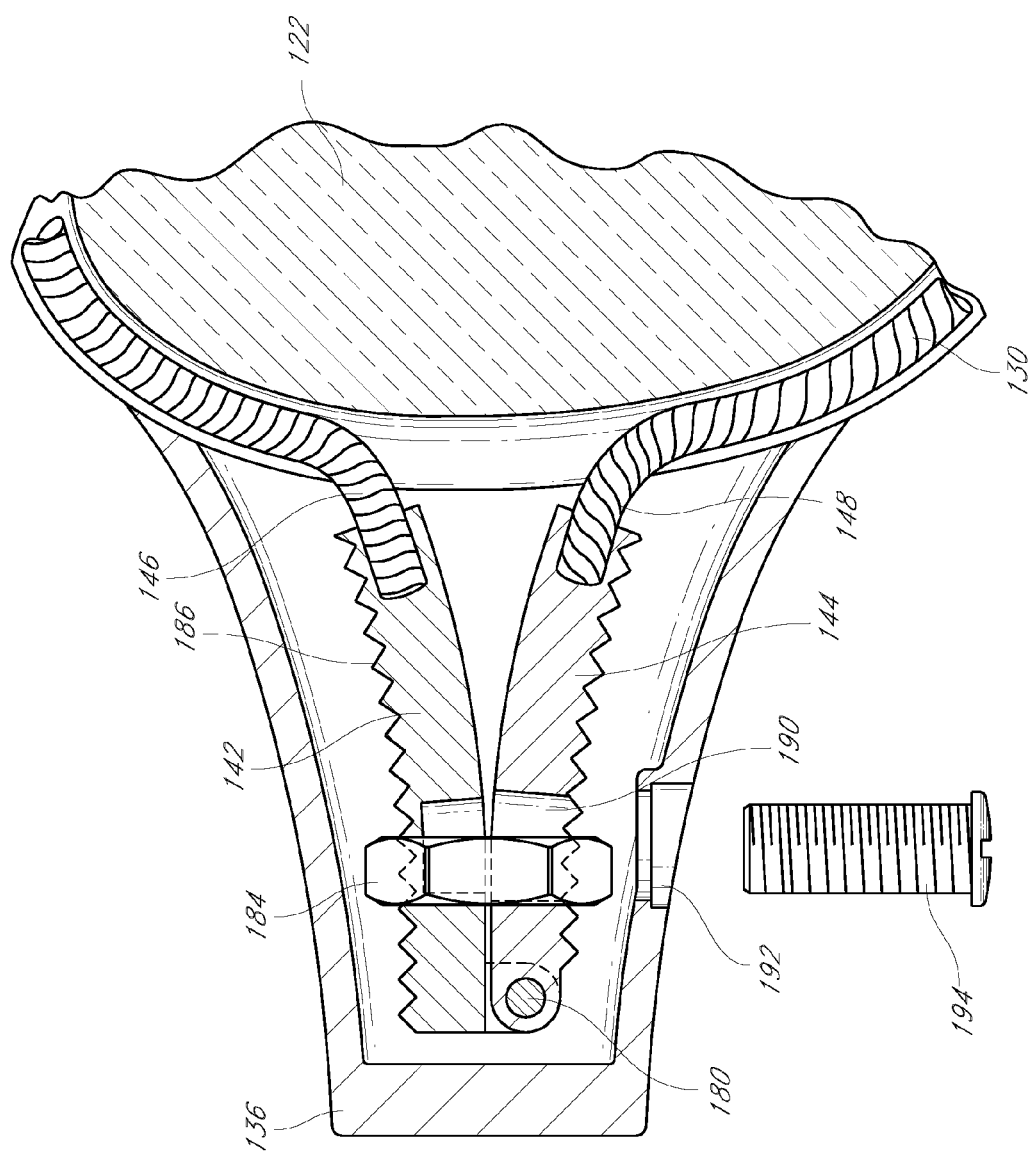
FIGS. 13 and 14 are cross-sectional views of a portion of the hinged tension assembly of FIG. 12.
Figure 14:
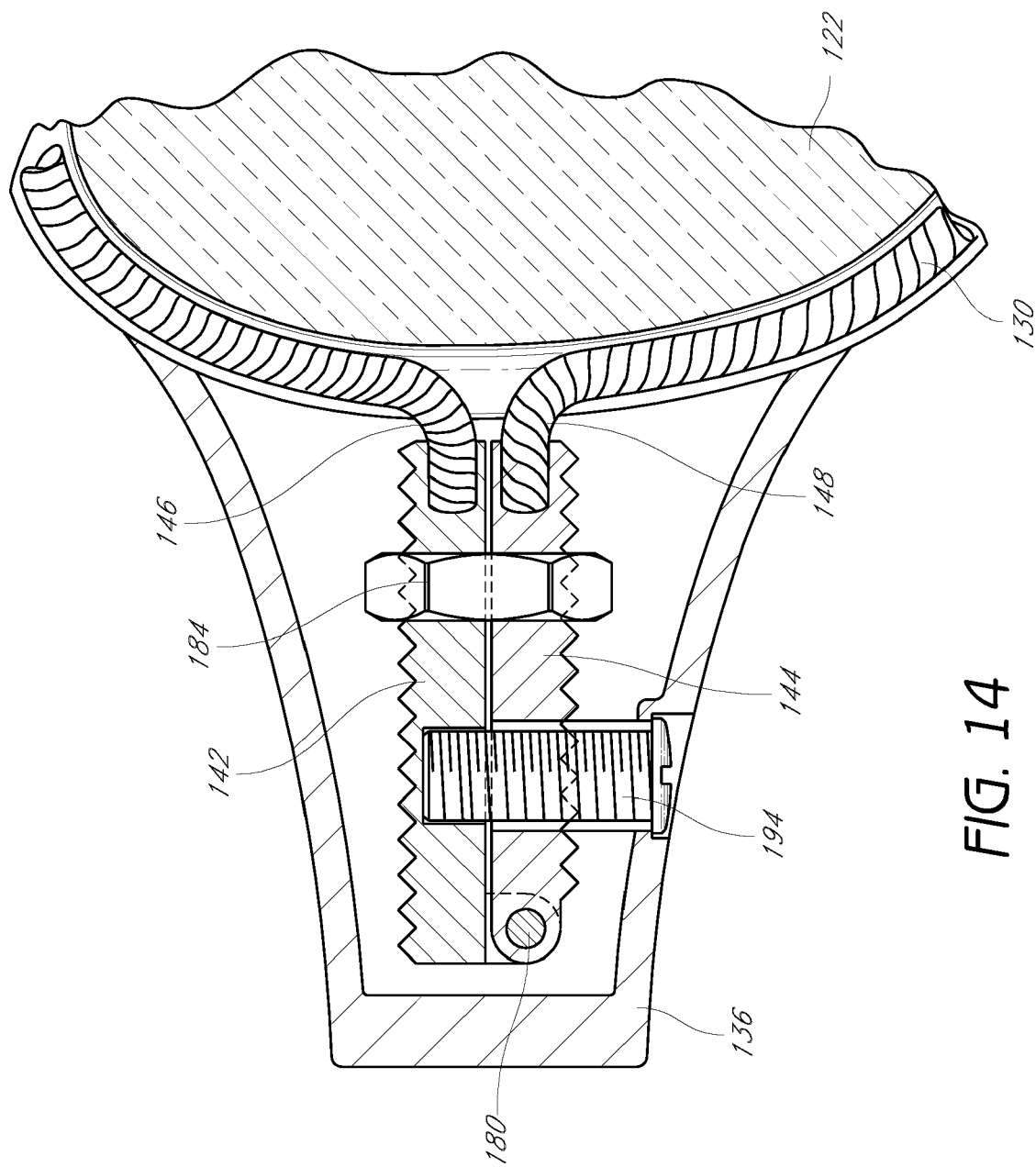

With reference to FIGS. 12-14, the first and second members 142, 144 can be drawn together using a nut 184 or another suitable member. The nut 184 can be threaded on to the first and second member 142, 144 from either end. In one configuration, the cylinder resulting from the combined first and second members 142, 144 can comprise external threads 186 while the nut 184 comprises mating internal threads 188. The nut 184 can be threaded from the hinged end or the other end. In one configuration, prior to the wire loop formed by the wire 130 and the first and second members 142, 144 being positioned over the lens 122, the nut 184 is moved from the end of the first and second members 142, 144 closest to the connection to the wire 130 toward the opposite end of the first and second members 142, 144, which allows the wire loop to expand. To help with this expansion, the first and second members 142, 144 can be somewhat flexible, as shown in FIG. 13.

Tightening the nut 184 toward the lens 122 draws the first and second member 142, 144 together, which tightens the wire loop around the lens 122. While FIG. 13 illustrates an end piece 136 as positioned over the assembly 140 prior to the nut 184 being tightened, the end piece 136 preferably is not positioned over the assembly 140 until the wire loop is tightened around the lens 122, as shown in FIG. 14.

The first and/or second members 142, 144 can comprise a locking aperture 190. The locking aperture 190 can be aligned with an opening 192 through the end piece 136. The locking aperture 190 and the opening 192 preferably receive a fastener 194 such that the fastener 194 can secure the end piece 136 over the assembly 140. Other suitable techniques can be used to secure the end piece 136 to the assembly 140. While the illustrated locking aperture 190 comprises a non-threaded portion in the second member 144, in some embodiments the second member 144 can comprise a threaded portion.

Figure 15:
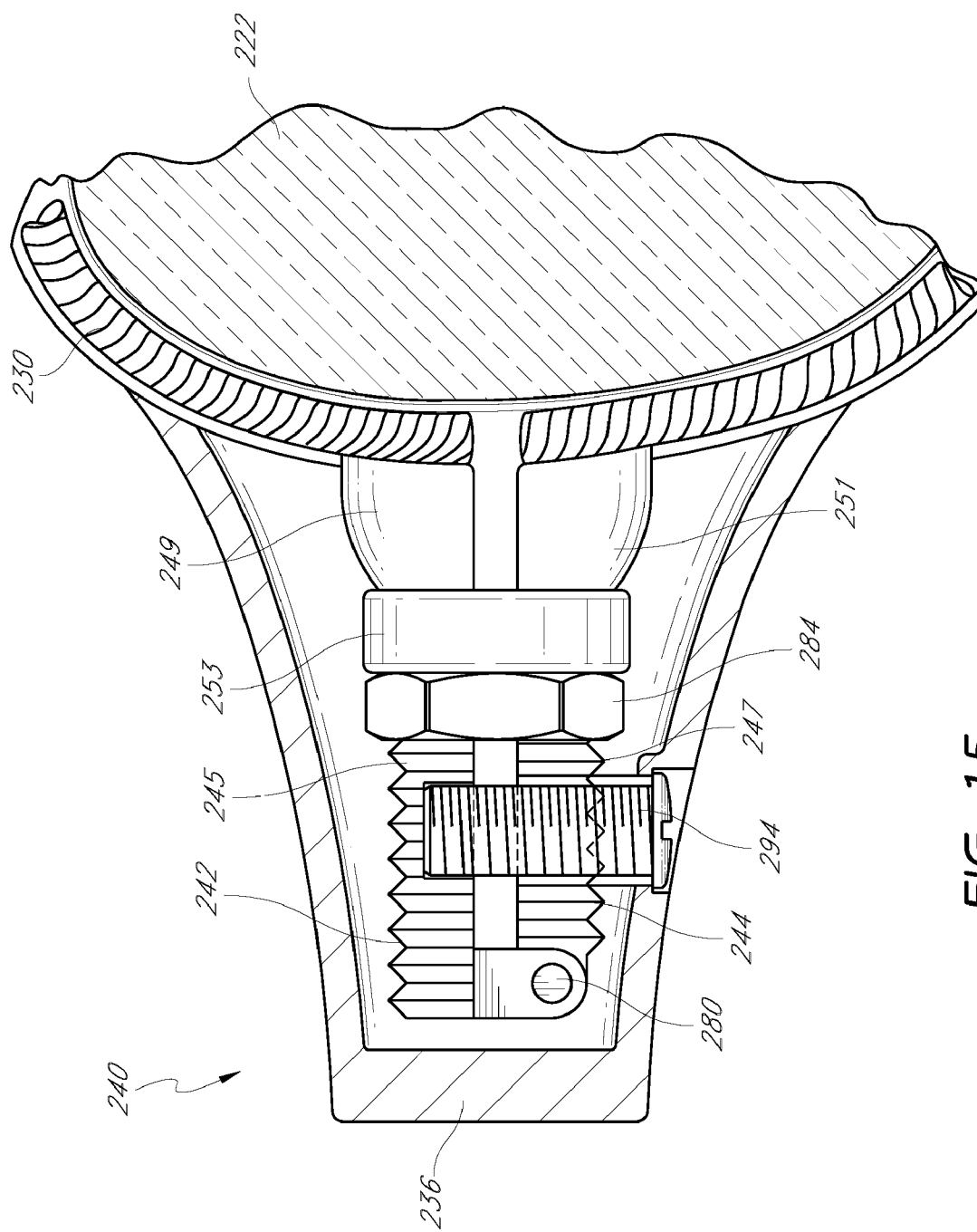
FIG. 15 is a cross-sectional view of a further embodiment of a hinged tension assembly that is arranged and configured in accordance with certain features, aspects and advantages of the present invention.

With reference now to FIG. 15, a further embodiment is illustrated. The illustrated assembly 240 is similar to the embodiment of FIG. 12. As illustrated, the assembly 240 comprises a first member 242 and a second member 244 that are connected by a pin 280. In some configurations, the first and second members 242, 244 are not pivotally connected but are integrally formed and have sufficient flexibility to allow them to separate until brought together in the manner discussed below.

A portion of the first member 242 and a portion of the second member 244 can be threaded 245, 247 and another portion of each can comprise a diverging surface 249, 251. The diverging surfaces 249, 251 can be conical, spherical or any other suitable shape.

With continued reference to FIG. 15, a collar 253 can be positioned between a nut 284 and the diverging surfaces 249, 251. The collar 253 can have a cylindrical or tapering inner surface, depending upon the application. The outer surface of the collar 253 can have any suitable configuration. In some configurations, the collar 253 can be an extension and, therefore, an integral part, of the nut 284. As the nut 284 is tightened toward the lens 222, the collar 253 urges the portions of the first and second members 242, 244 together through an interaction of the diverging surfaces 249, 251 and one or more surfaces of the collar 253. Other suitable configurations also can be used.

As the collar 253 urges the first and second members 242, 244 together, the wire loop formed by the wire 230 and the first and second members 242, 244 tightens around the lens 222 because the wire 230 is joined to the first and second members 242, 244. Any suitable manner of coupling the first and second members 242, 244 to the wire 230 can be used.

The first and second members 242, 244 can be secured to an end piece 236 in any suitable manner. In the illustrated configuration, the first and second members 242, 244 are positioned inside of the end piece 236 and a fastener 294 secures the end piece 236 in position over the first and second members 242, 244.

Figure 16:
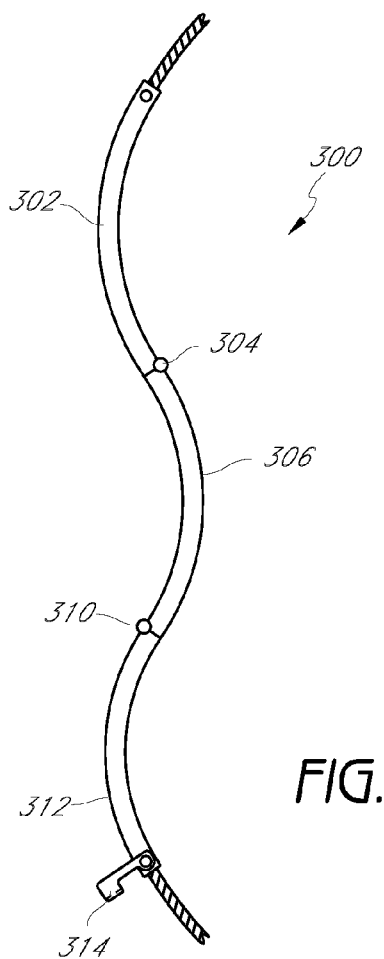
FIGS. 16 and 17 are side views of an embodiment of a hinged tension assembly that is arranged and configured in accordance with certain features, aspects and advantages of the present invention.
Figure 17:
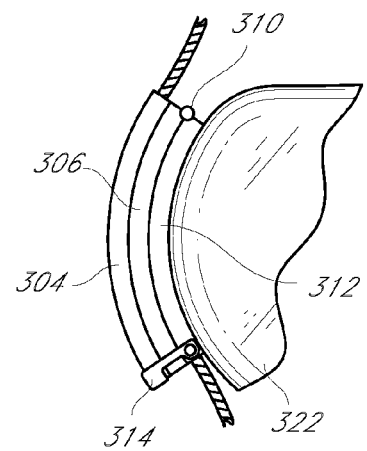
Figure 18:
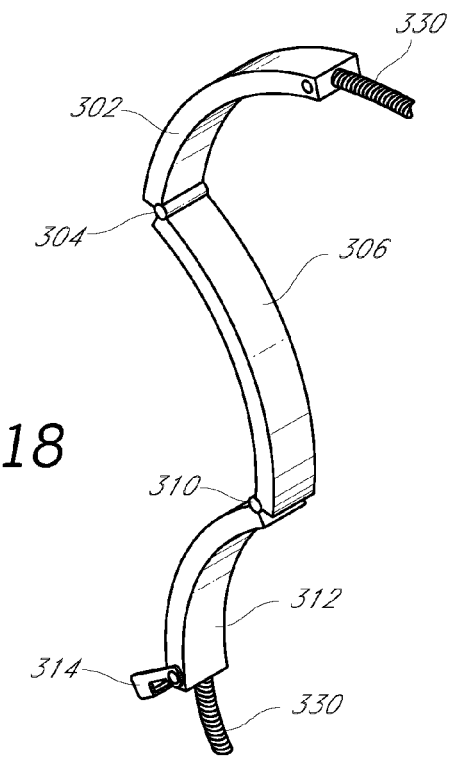
FIG. 18 is a perspective view of the assembly of FIG. 16.

With reference to FIGS. 16-18, a further embodiment is illustrated therein. As illustrated in FIG. 16, a hinged tensioning assembly 300 can comprise multiple members. In the illustrated configuration, the hinged tensioning assembly 300 comprises a first member 302 that is joined by a hinge 304 to a second member 306. The second member 306 can be joined by a hinge 310 to a third member 312. As illustrated, the hinges 304, 310 attached to the second member 306 can be configured such that the first member 302 folds toward a first side of the second member 306 and such that the third member 312 folds toward a second side of the second member 306. A clasp 314 can be provided to secure the assembly 300 in the folded position.

In use, the third member 312 can be positioned alongside a lens 322 and the second and first members 306, 302 can be folded toward the third member 312. When folded, the wire 330 is drawn tight around the lens 322 and the clasp 314 can be used to secure the assembly 300 in the folded position. Other configurations can be used to secure the assembly in a folded position. In addition, an end piece can be attached to, or integrally formed with, the first member 302. Moreover, in some configurations, the assembly 30 can be attached to both sides of a nose bridge (not shown) such that the assembly 30 will be significantly obscured from view by nose pads associated with the nose bridge.

In some configurations, the wire 330 can be secured along the first and third members 302, 312 in multiple locations. In other configurations, the first and/or third members 302, 312 can be clamped into position along the wire 330 such that the diameter of the loop can be easily adjusted. Any suitable clamping mechanism can be used, both permanent styles (e.g., crimping) and more temporary styles. In other words, the wire 330 can be fed further into either or both of the first and third members 302, 312. As the wire is fed into the members, the loop diameter becomes smaller in both the open and closed positions.

FIG. 19 illustrates a further embodiment of eyewear 420 in which an end piece 436 is connected to the eyewear 420 in a manner different from that shown in FIG. 3, for instance. As shown, the configuration of FIG. 19 features a tensioning assembly 440 similar in some respects to the embodiment of FIG. 15. The tensioning assembly 440 comprises first and second members 442, 444 that are integrally formed in the illustrated configuration. While being integrally formed, the first and second members 442, 444 preferably are capable of relative movement such that a gap 445 separating the first 442 and second members 444 can be closed at one end more than at the other end.

With reference to FIG. 19, a collar 453 preferably is axially moveable along toward the first and second members 442, 444 along with a nut 484 or other fastener. Preferably, the nut 484 urges the collar 453 against sloping surfaces of the first and second members 442, 444. The first and second members 442, 444 are secured to ends of a wire 430 and movement of the collar 453 along the sloping surfaces of the first and second member 442, 444 draw the ends of the wire 430 together.

In the illustrated embodiment, the end piece 436 preferably defines a sleeve that generally encloses at least a portion, but preferably the entirety, of the first and second members 442, 444. The illustrated end piece 436 can slide over the first and second members 442, 444 and into abutment with a peripheral surface of a lens 422. The end piece 436 can be secured into position over the first and second members 442, 444 with a fastener 437. In the illustrated configuration, the fastener 437 is an acorn nut. Other types of fasteners, male or female, can be used depending upon the application.

The illustrated end piece 436 features an ear stem 434 connected by a hinge 438. Other configurations may not include the hinge 438 and yet other configurations may not include the ear stem 434. In the illustrated configuration, the end piece 436 is secured in any desired angular orientation relative to the lens 422 by the nut 437. In some configurations, the end piece 436 and/or the lens 422 can comprise one or more structures that can define one or more angular orientations at which the ear stem 434 extends relative to the lens 422. For instance, a slot can be formed that accommodates a portion of the lens 422 and, therefore, secures the end piece 436 and the associated ear stem 434 in a specific angular orientation.

With reference now to FIG. 20, a further embodiment is illustrated in which the end piece 536 cooperates with a first member 542 and a second member 544 such that no additional collar and fasteners (e.g., the collar 453 and nut 484) are used. In the illustrated configuration, the end piece 536 extends over at least a portion of the first and second members 542, 544. The end piece 536 moves along the first and second members 542, 544 as a fastener 537 is threaded onto a threaded end of the first and second members 542, 544. As the end piece 536 moves toward a lens 522, the end portions of the first and second members 542, 544 closest to the lens 522 are urged toward each other, a gap 545 closes at one end, which tightens a wire 530 around the lens 522.

The illustrated configuration reduces the number of components compared to an arrangement such as that shown in FIG. 19 while providing an ability to secure an ear piece in any of a number of desired orientations. For instance, frictional forces created between an interior surface 539 of the end piece 536 reduce the ability of the end piece 536 to rotate relative to the first and second members 542, 544. In some configurations, however, structures, such as a tongue and groove type of configuration, can be used to reduce or eliminate the ability to rotation the end piece 536 relative to the first and second members 542, 544. In one configuration, the interior surface 539 is sloped to increase the surface contact between the interior surface 539 and the first and second members 542, 544.

Not all embodiments will necessarily include an end piece, or an end piece with a recess, that connects to a temple, or ear piece. For instance, in some configurations, it may be desirable to attach the temple, or ear piece, directly to a portion of the hinged tensioning assembly such that the temple, or ear piece, is aligned properly when the assembly is in the closed position. In other configurations, the tensioning assembly 40 can be located elsewhere with respect to the lens 22, such as at the nose bridge 28 or in another region of the eyewear 20. In at least one such configuration, a single assembly can be used to tension the wires that extend around both lenses. Other suitable configurations also can be constructed when relying upon the principles discussed above.

In addition, while some of the embodiments discussed above describe a threaded outer surface, the threaded outer surface can be replaced by other suitable structures. In some configurations, the outer surface can be ribbed and the nut can be replaced by a member that slides over the ribs and can lock into position on or between ribs. For instance, the ribs can comprise teeth such as on a zip tie and the nut or the replacement for the nut can comprising interlocking structure. In some other configurations, the nut can be secured in position using snap fitting, press fitting or the like.

While certain embodiments have been described above, other suitable arrangements of a pivotal coupling of wire termination members or connectors may also be used. Furthermore, in some configurations, the connectors or wire termination members may be coupled for relative movement in a manner other than pivotal movement, such as translation or telescopic movement, for instance but without limitation. In some arrangements, the connectors or wire termination members may not be coupled at all except by the threaded fastener or the like that draws the connectors or wire termination members together.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above.

What is claimed is:

1. Eyewear comprising a lens, the lens comprising an outer peripheral surface, the outer peripheral surface comprising a groove, a wire positioned in the groove, the wire comprising a first end and a second end, the first end connected to a first termination member, the second end connected to a second termination member, at least one of the first termination member and the second termination member being capable of movement relative to the other termination member, and at least one of the first termination member and the second termination member being connected to an ear stem, wherein an outer portion of the first termination member is at least partially threaded and an outer portion of the second termination member is at least partially threaded and an internally threaded member is moveable along the first and second termination members.

2. The eyewear of claim 1, wherein the first termination member comprises a threaded opening and the second termination member comprises a non-threaded opening and a fastener extends through the non-threaded opening into the threaded opening.

3. The eyewear of claim 1 further comprising means for moving at least a portion of the first termination member and at least a portion of the second termination member closer together.

4. The eyewear of claim 1 further comprising means for connecting the first termination member to the first end of the wire.

5. The eyewear of claim 4, wherein the means for connecting comprises a passage and a portion of the first end of the wire extends into the passage.

6. The eyewear of claim 5, wherein the first termination member is deformed to lock the first termination member and the first end of the wire together.

7. The eyewear of claim 6, wherein the deformation comprises a crimp.

8. The eyewear of claim 4, wherein the means for connecting comprises welding or brazing the first termination member to the first end of the wire.

9. The eyewear of claim 1, wherein the ear stem is connected to an end piece and the first and second termination members are positionable within the end piece.

10. The eyewear of claim 1, wherein the first and second termination members are disposed within a recess formed inside of an end piece and the end piece is secured to at least one of the first and second termination members.

11. The eyewear of claim 10, wherein a threaded member secures the end piece to the first termination member.

12. The eyewear of claim 11, wherein the threaded member extends through the second termination member.

13. The eyewear of claim 1, wherein an outer portion of the first termination member comprises an expanding surface and a collar contacts the expanding surface such that movement of the collar along the expanding surface moves the first and second termination members closer together.

14. Eyewear comprising a lens, the lens comprising an outer peripheral surface, the outer peripheral surface comprising a groove, a wire positioned in the groove, the wire comprising a first end and a second end, the first end connected to a first termination member, the second end connected to a second termination member, at least one of the first termination member and the second termination member being capable of movement relative to the other termination member, and at least one of the first termination member and the second termination member being connected to an ear stem, wherein the first termination member and the second termination member define a hinge that pivotally secures the first termination member and the second termination member together.

15. The eyewear of claim 14, wherein the hinge comprises a pivot axis that is offset from at least one of the first termination member and the second termination member.

16. The eyewear of claim 14, wherein the first termination member comprises a threaded opening and the second termination member comprises a non-threaded opening and a fastener extends through the non-threaded opening into the threaded opening.

17. The eyewear of claim 14 further comprising means for moving at least a portion of the first termination member and at least a portion of the second termination member closer together.

18. The eyewear of claim 14 further comprising means for connecting the first termination member to the first end of the wire.

19. The eyewear of claim 18, wherein the means for connecting comprises a passage and a portion of the first end of the wire extends into the passage.

20. The eyewear of claim 19, wherein the first termination member is deformed to lock the first termination member and the first end of the wire together.

21. The eyewear of claim 20, wherein the deformation comprises a crimp.

22. The eyewear of claim 18, wherein the means for connecting comprises welding or brazing the first termination member to the first end of the wire.

23. The eyewear of claim 14, wherein the ear stem is connected to an end piece and the first and second termination members are positionable within the end piece.

24. The eyewear of claim 14, wherein the first and second termination members are disposed within a recess formed inside of an end piece and the end piece is secured to at least one of the first and second termination members.

25. The eyewear of claim 24, wherein a threaded member secures the end piece to the first termination member.

26. The eyewear of claim 25, wherein the threaded member extends through the second termination member.

* * * * *